United States Patent [19]
Hartzell

[11] 3,831,615
[45] Aug. 27, 1974

[54] ELECTRICALLY CONTROLLED GOVERNORS
[75] Inventor: James R. Hartzell, Troy, Ohio
[73] Assignee: Piqua Aircraft Company, Piqua, Ohio
[22] Filed: Aug. 31, 1972
[21] Appl. No.: 285,242

Related U.S. Application Data
[63] Continuation-in-part of Ser. No. 62,859, Aug. 11, 1970.

[52] U.S. Cl............. 137/53, 73/518, 73/540, 137/49
[51] Int. Cl. .................................... G05d 13/38
[58] Field of Search ............ 73/510, 513, 518, 537, 73/540, 541; 91/366; 137/49, 51, 53

[56] References Cited
UNITED STATES PATENTS

| | | | |
|---|---|---|---|
| 267,446 | 11/1882 | Mott | 73/540 X |
| 2,643,871 | 6/1953 | Warrick | 73/540 X |
| 2,650,617 | 9/1953 | Wasser | 251/129 |
| 2,715,528 | 8/1955 | Schulte | 73/540 X |
| 2,797,913 | 7/1957 | Moulton | 73/518 |
| 2,890,877 | 6/1959 | Straznickas | 73/540 X |
| 2,965,115 | 12/1960 | Stivender | 73/518 X |
| 3,098,635 | 7/1963 | Delaporte et al. | 251/129 X |
| 3,329,165 | 7/1967 | Lang | 251/129 X |
| 3,439,694 | 4/1969 | Davis et al. | 137/53 |

FOREIGN PATENTS OR APPLICATIONS

855,383   2/1940   France.................................. 73/541

*Primary Examiner*—Robert G. Nilson
*Attorney, Agent, or Firm*—Melvin A. Crosby

[57] ABSTRACT

An electric control for a governor in which a governor comprises a speed sensitive actuator, such as a flyball actuator, operating against a spring bias with electromagnetic means associated with the actuator for biasing the actuated element in either one direction or the other.

4 Claims, 3 Drawing Figures

3,831,615

ELECTRICALLY CONTROLLED GOVERNORS

RELATED APPLICATION

James R. Hartzell, et al.
Ser. No. 62,859
Filed: Aug. 11, 1970
Title: APPARATUS FOR CONTROLLING THE SPEED AND PHASE OF ENGINES The present application is a continuation-in-part of this related application.

The present invention relates to governor controls and is particularly concerned with an electric control arrangement for governors.

The present application is a continuation-in-part of copending application, Ser. No. 62,859, entitled "Apparatus for Controlling the Speed and Phase of Engines," filed in the names of James R. Hartzell and Arley Reas, said application having been filed Aug. 11, 1970 and assigned to the same assignee as the present application and now U.S. Pat. No. 3,689,175.

Governors are well known and usually comprise speed sensitive devices for effecting a control influence on a mechanism such as an engine, or a motor, or the like. A common type of governor employs a hydraulic reversing valve with a flyball actuator connected thereto to shift the valve member in one direction and a spring acting on the valve member in the opposite direction. The control function is realized by the balance which is established between the flyball actuator and the biasing spring, usually referred to as a speeder spring.

Normally, such governors are not provided with any fine adjusting means and are quite often preset at the time of manufacture.

The present invention proposes the provision of electrical biasing means for such an arrangement which will operate either to augment or to oppose the action of the speeder spring thereby permitting extremely fine control and adjustment of the governor.

The present invention also proposes various manners in which electrical means can be incorporated in a governor structure to assist in the regulation thereof.

The exact nature of the present invention will become more apparent upon reference to the following detailed specification taken in connection with the accompanying drawings in which.

BRIEF SUMMARY OF THE INVENTION

According to the present invention, a governor, preferably in the form of a valve having a valve body and a reciprocating valve member, is provided with a governor embodying a flyball actuator operatively interposed between the valve body and the valve member for shifting the valve member in response to the speed at which the flyball actuator is driven in rotation. A speeder spring acting on the valve member opposes the flyball actuator.

According to the present invention, a solenoid coil is provided which can be variably energized and which acts on an armature associated with a moveable part of the arrangement to bias the valve member in one direction or the other thereby to modify the action of the speeder spring. In one form of the invention, an armature is connected to the valve member and is reciprocal on the axis of the solenoid.

In another modification, the valve body is nonmagnetic and the valve member is magnetic and the solenoid coil is mounted around the valve body and influences the valve member.

In still another modification, the solenoid is mounted in association with the flyball actuator and influences the movement of the flyballs thereby to modify the operation of the valve.

DETAILED DESCRIPTION OF THE INVENTION

Figure 1:
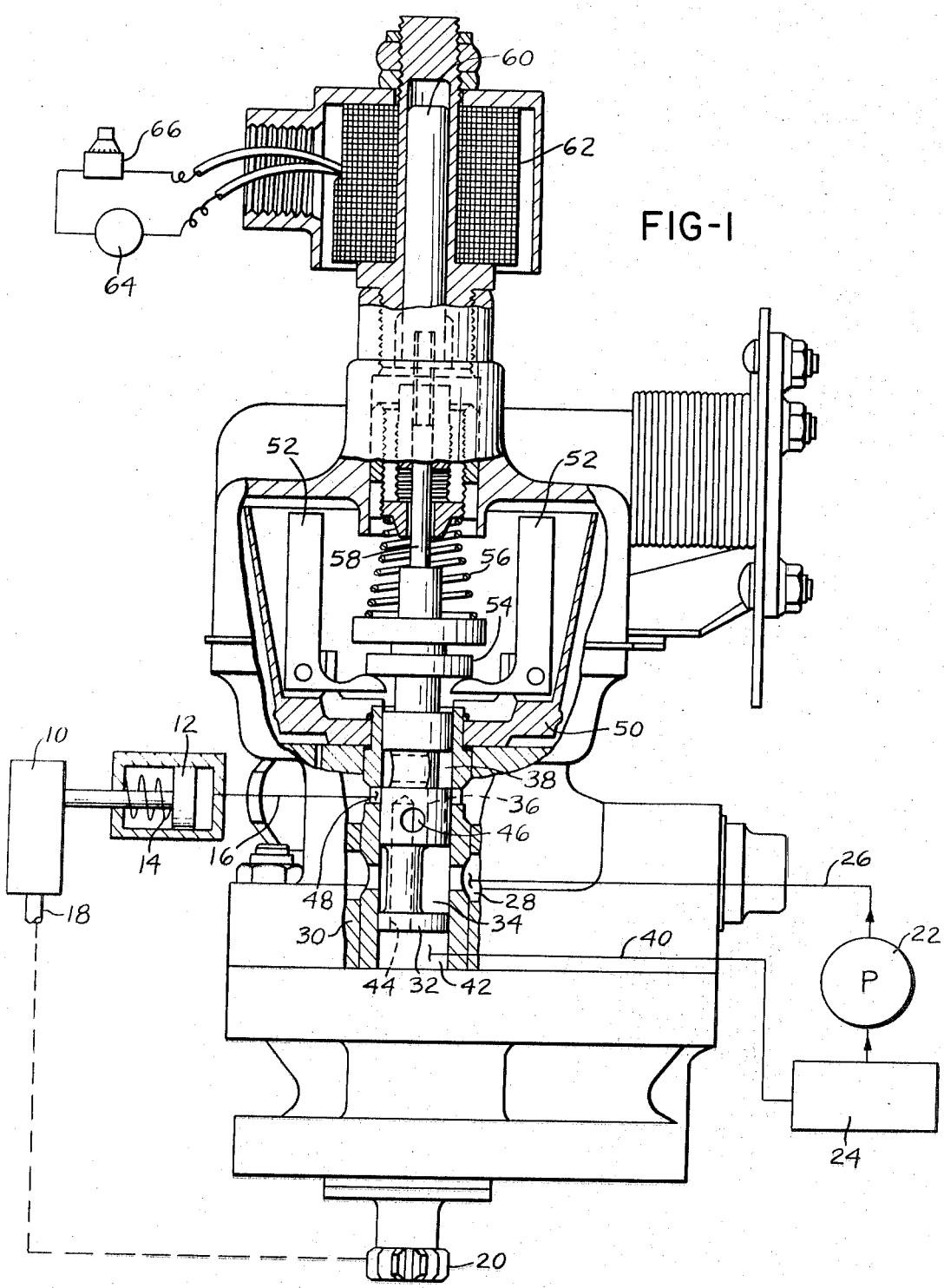
FIG. 1 is a sectional view through a governor controlled valve arrangement having electrical adjusting means according to the present invention.

Referring to the drawings somewhat more in detail, in FIG. 1, 10 shows an engine or motor or other device, the speed of which is under the control of a piston 12 which is urged in one direction by a spring 14 and which is urged in the other direction by a supply of pressure fluid supplied via a conduit 16. The device 10 has an output shaft 18 which is connected with an input gear 20 which, as will be seen hereinafter, drives a flyball actuator in rotation.

The supply of pressure fluid to conduit 16 is derived from a pump 22 having its inlet side connected to a reservoir 24 and discharging via pressure conduit 26 to the inlet 28 in valve sleeve 30 within which is reciprocably mounted valve member 32. Valve member 32 has three spool portions thereon and the space 34 between the two lowermost thereof is continuously supplied with pressure via inlet 28. This pressure is conducted by drilled axial passage 36 in the central spool of the valve member to the space 38 disposed between the upper two spools of the valve member.

The reservoir 24 is connected by conduit 40 with the space 42 beneath the valve member and this space is connected by drilled passage 44 in the valve member with the radial port 46 in the central spool of the valve member.

Conduit 16, previously referred to, leads to a port 48 in valve sleeve 30 and this port can either be supplied with pressure from space 38 when the valve member moves downwardly from the position shown, or it can be connected to exhaust via port 46 when the valve member moves upwardly from the position in which it is illustrated.

The aforementioned input gear 20 is connected to a carrier 50 which is driven in rotation by gear 20 and on which is pivotally mounted a pair of flyball weight members 52. These flyball weight members engage a bearing 54 mounted on the valve member, while disposed between the valve member and a stationary part of the valve body is a speeder spring 56. At this point, it will be apparent that when the speed of rotation of the carrier 50 increases, the flyball weight members will tend to move outwardly and cause valve member 32 to move upwardly whereas reduction in the speed of rotation of carrier 50 will permit speeder spring 56 to prevail and move valve member 32 downwardly.

According to the present invention, valve member 32 has a rod-like extension 58 thereon to the upper end of which is connected to magnetic armature 60 which is reciprocable on the axis of a solenoid 62. At this point, it will be apparent that energization of solenoid 62 will cause an upward pull on armature 60 thereby opposing the action of speeder spring 56.

Energization of the solenoid can be accomplished in a number of different ways, but in FIG. 1, a source of electrical energy is shown at 54 connected to the terminals of the solenoid with a control element 66, a rheostat, for example, interposed in the circuit so that the amount of current supplied to coil 62 can be adjusted to a fine degree.

Figure 2:
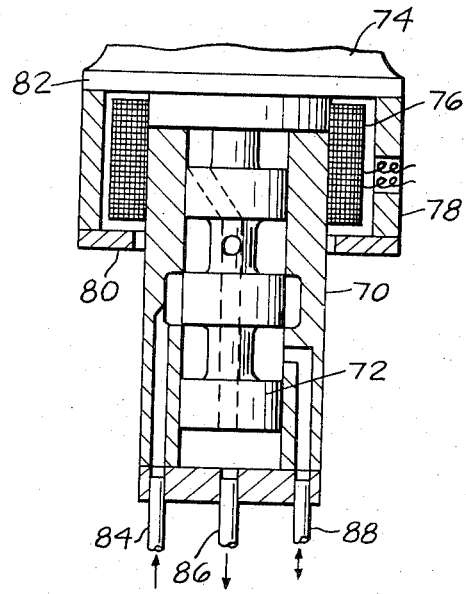
FIG. 2 is a partial section through a governor valve showing a different manner of applying the electrical means to the valve.

In FIG. 2, a modification is shown in which the valve body 70 is nonmagnetic, whereas valve member 72 is magnetic, and the same sort of governor and speeder spring arrangement is connected to the valve member in the portion 74 of the assembly and which is broken away in FIG. 2.

The coil 76 in FIG. 2 is mounted about the valve body and, when variably energized, will variably attract spool 72, thereby to exert an axial bias thereon. While the valve body is nonmagnetic, the ring 78 surrounding the solenoid 76 is preferably magnetic, as is the bottom ring 80 mounted on the bottom of ring 78 and the top plate 82 which closes the upper end of the valve body.

In FIG. 2, the pressure inlet conduit is indicated at 84, the exhaust conduit at 86 and the service conduit leading the controlled device at 88.

Figure 3:
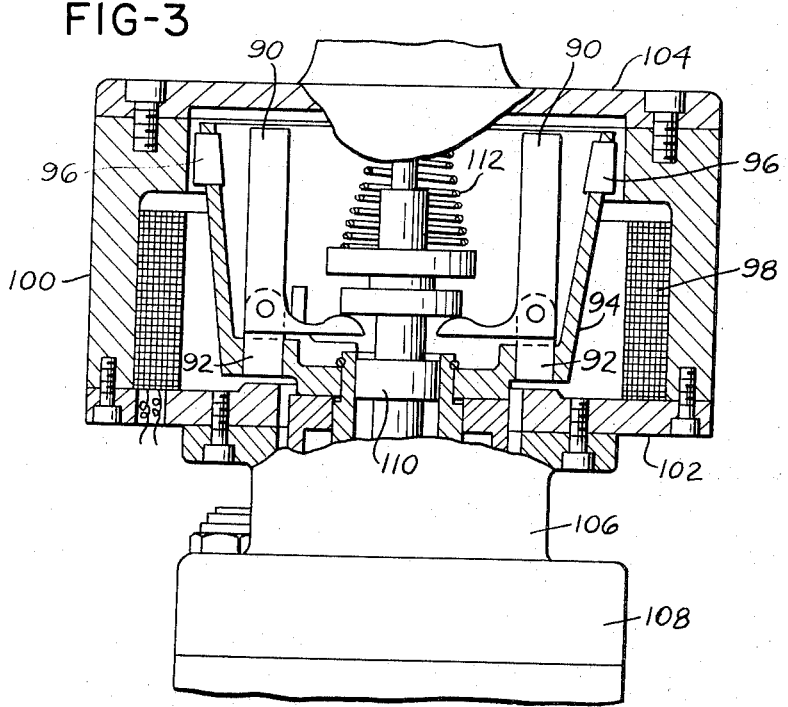
FIG. 3 is another fragmentary sectional view showing still another manner in which the electrical means can be associated with the valve.

In FIG. 3, an arrangement is illustrated in which the flyball members 90 are formed of magnetic material and are supported on posts 92 of magnetic material which are mounted in a carrier 94 of nonmagnetic material. Adjacent the flywheel members, the nonmagnetic carrier 94 may carry magnetic plug members 96. The coil 98 in the FIG. 3 modification is mounted inside a magnetic housing 100 which has a magnetic bottom plate 102 and which is closed at the top by a nonmagnetic plate 104.

The body 106 of the valve 108 which is influenced by the flyball actuator is also preferably nonmagnetic.

In FIG. 3 modification, energization of coil 98 will impart an outward bias on flyball weights 90 thereby exerting a bias on the valve member 110 in opposition to speeder spring 112.

It will be apparent that in any of the modifications, the solenoid and armature pertaining thereto could be so arranged that instead of opposing the speeder spring, bias could be exerted on the valve member and assist the speeder spring.

In every case, however, the arrangement provides for extremely fine control of the governor action because extremely fine adjustment of the bias on the valve member can be made at any time.

It is also possible for the current controlling component 66 to be automatically controlled, as from a master source or the like, if so desired.

Modifications may be made within the scope of the appended claims.

What is claimed is:

1. In a governor controlled valve; a stationary part comprising a valve body having a bore and fluid passages opening into said bore, a sleeve rotatable in said bore but nonaxially moveable therein and having ports communicating with said passages, a valve member reciprocable in said sleeve and controlling said ports, a speeder spring acting between said stationary part and said valve member and biasing said valve member in one direction in said sleeve, a flyball structure at one end of the valve body comprising a carrier connected to one end of said sleeve for rotation therewith and flyball members pivotal on said carrier, means at the other end of said valve body for driving said sleeve and carrier in rotation, bearing means operatively interposed between said flyball members and said valve member, said flyball members being operable to move said valve member against the bias of said spring in response to increasing speed of rotation of said carrier and to permit said spring to move said valve member in response to decreasing speed of rotation of said carrier, a tubular member fixedly mounted on said stationary part and coaxial with said valve member and on the opposite side of said flyball structure from said valve member, a cylindrical armature of uniform cross section throughout the length reciprocably disposed in said tubular member, a rod fixedly connecting the armature to said valve member for axial movement of the armature and valve member in unison, a solenoid mounted on said tubular member in surrounding relation thereto and at least in part coextensive with said armature in the axial direction, and means for variably energizing said solenoid thereby to exert a variable bias on said armature and valve member in the axial direction, axial movement of said armature in said tubular member effecting a gradual change in the reluctance of the magnetic path of the field established by said solenoid.

2. A governor controlled valve according to claim 1 which includes a cup shaped frame member mounted on said tubular member in surrounding relation to said solenoid and substantially coextensive therewith in the axial direction.

3. A governor controlled valve according to claim 2 in which said tubular member is open on the end facing said valve member and closed on the other end.

4. A governor controlled valve according to claim 3 in which said tubular member is formed with an external radial flange near said one end thereof, said solenoid at one end engaging said flange, said cup shaped frame having the bottom wall apertured to fit over said other end of said tubular member with the peripheral wall of said cup shaped frame dependent about said solenoid, and nut means threaded on said other end of said tubular member and clamping said cup shaped frame against the adjacent end of said solenoid.

* * * * *